July 26, 1938.  S. G. RUSSELL ET AL  2,124,634

FISHING REEL

Filed Sept. 16, 1936

INVENTOR.
SAMUEL G. RUSSELL
FRANK BURDICK
BY Chappell, Earl & Chappell
ATTORNEY.

Patented July 26, 1938

2,124,634

UNITED STATES PATENT OFFICE 2,124,634

FISHING REEL

Samuel G. Russell and Frank Burdick, Kalamazoo, Mich., assignors to Shakespeare Company, Kalamazoo, Mich.

Application September 16, 1936, Serial No. 100,996

17 Claims. (Cl. 242—84.5)

The main objects of this invention are:

First, to provide in a fishing reel an improved means permitting free stripping of the line therefrom and manually operable means for permitting the line to be automatically wound upon the spool when desired.

Second, to provide a reel of the type described having improved brake means of simple design which is highly efficient and silent in operation.

Third, to provide in a spring wind fishing reel an automatically acting brake which permits free stripping of the line, the brake acting, on releasing tension or pull on the line, to prevent the spring winding up the line until the brake mechanism is manually released, with means for locking the release mechanism so that the reel can be handled or manipulated without danger of accidental releasing of the brake.

Objects relating to details and economies of the invention will appear from the description to follow. The invention is defined and pointed out in the claims.

A structure which is a preferred embodiment of our invention is illustrated in the accompanying drawing, in which.

Figure 1:
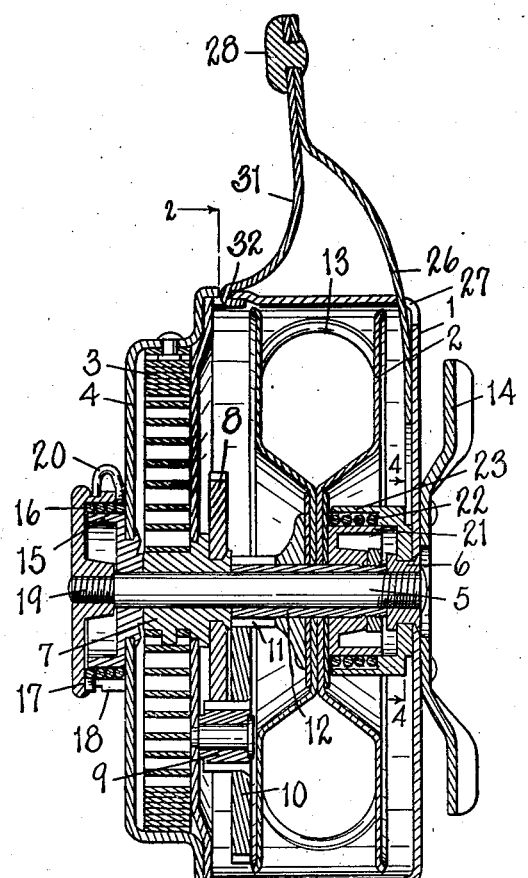
Fig. 1 is an enlarged view mainly in section on line 1—1 of Fig. 2 of a reel embodying the features of our invention.
Figure 2:
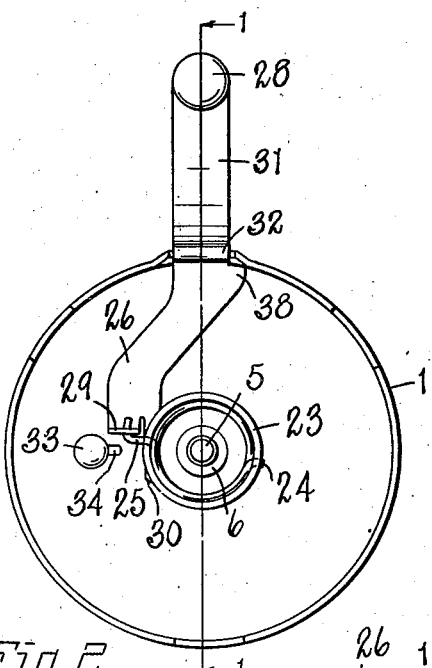
Fig. 2 is a view corresponding to line 2—2 of Fig. 1 with the spool gear train, the spool, and connected brake drum omitted.
Figure 4:
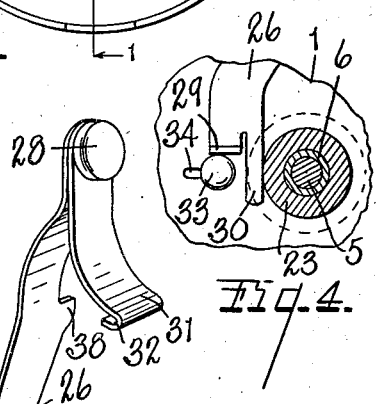
Fig. 4 is an enlarged fragmentary view partially in section illustrating the stop for rendering the manual brake release lever inoperative.
Figure 5:
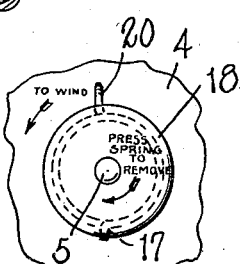
Fig. 5 is a fragmentary view looking from the left of Fig. 1 illustrating details of the winding drum friction ratchet.
Figure 3:
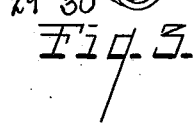
Fig. 3 is a perspective view illustrating the brake release lever and its operative relation to the brake band element.

Our present improvements are particularly designed by us for embodiment in the type of reel shown in our copending application, Serial No. 82,844, filed June 1, 1936, although certain features thereof are adapted for embodiment in other relations.

Referring to the drawing, the embodiment of the invention illustrated comprises a housing or frame designated generally by the numeral 1 and designed to receive the spool designated generally by the numeral 2. The winding or driving spring 3 is housed within the spring winding drum or spring casing 4 which is rotatably supported relative to the main frame or casing 1.

The spool is rotatably mounted on the staff or spindle 5 which is threaded into the bushing or thimble 6 mounted on the bottom portion of the casing 1. The inner end of the spring is connected or engaged with the hub 7 of the driving gear 8, this hub being rotatable on the staff. The gear 8 meshes with a pinion 9 having a gear 10 fixed thereto which in turn meshes with the pinion 11 on the sleeve-like hub 12 of the spool.

The casing is provided with suitable line openings 13. The frame or casing is also provided with a suitable base or reel seat plate 14.

The winding drum 4 is provided with a friction ratchet consisting of the ratchet or clutch drum 15 secured to the winding drum 4 and the spirally coiled spring friction ratchet clutch or member 16 which is anchored at one end 17 to the housing or sleeve 18 threaded upon the end of the spindle 5 so that the sleeve is concentric of and encloses the spring ratchet member or clutch 16. This sleeve or housing member 18 is threaded upon the end of the staff or spindle, the threads 19 being left-hand threads. The free end of the spring clutch member is disposed through the sleeve 18 to provide a finger piece 20.

With the parts thus arranged, the ratchet spring serves the double function of holding the spool driving spring under tension and it acts to hold the cap sleeve so that it is not necessary to use separate nuts or securing means for retaining it upon the spindle When it is desired to remove this member 18 to free the spring drum or casing, the ratchet clutch spring is released by manipulation of the finger piece which permits rotation of the member 18 in a direction to unthread or unscrew it from the shaft. To release the tension of the driving spring 3, the ratchet is also released by manipulation of the finger piece 20, whereby ratchet spring 16 is released or expanded to unclutch ratchet drum 15 so that drum 15 and the winding member 4 will rotate on spindle 5 under the force of spring 3, hub 7 being meanwhile held stationary by means to be hereinafter described.

We provide a brake means which automatically releases on the line unwinding rotation of the spool as results from a pull upon the line or the stripping of the line and automatically engages on the reverse or winding-in rotation of the spool. This brake means is substantially that of our copending application referred to and consists of the drum 21 operatively associated with the spool and a spirally coiled clutch band or spring 22, one end of which is secured to the cylindrical sleeve 23 mounted on the bushing 6 and supported concentrically of the drum. One end of this spring brake band is anchored at 24 to the sleeve 23, the other end projecting at 25 to be engaged by the slidable manually actuated releasing member 26 of spring material. This release member has a combined lever and slide movement and projects through an opening 27 in the casing in convenient position to be manipulated, it being provided with a finger button 28 at its outer end.

The release member has a laterally turned finger 29 at its inner end receiving the free end 25 of the spring and a guide finger 30 which slidably engages the bushing 6.

The lever 31 of spring material is fulcrumed and gripped at 32 and secured at its outer end to the member 26 by means of the finger button 28, the shank of which constitutes a rivet. With the parts thus arranged, when the lever 31 is moved towards the right, with the parts positioned as in Fig. 1, the member 26 is moved longitudinally into the casing, expanding the brake band and thereby releasing the brake. When pressure is removed from button 28, the spring members 31 and 26 return to original position, retracting the release member 26 and causing the brake to again be engaged.

The brake band is normally in frictional engagement with the brake drum and its coils are disposed so that the unwinding rotation of the spool acts to release the brake and the winding rotation thereof acts to engage the brake. However, in order to permit the spring to drive the spool for winding in the line, it is necessary to manually release the brake and that is accomplished through the parts described.

To prevent accidental releasing of the brake, we provide a manually adjustable stop 33 mounted in a slot 34 in the casing and slidably adjustable so that it may be adjusted into the path of the member 26 preventing releasing actuation thereof. This is very desirable as it prevents accidental releasing of the brake while the fisherman is threading up the line, for example, or in carrying his tackle through brush which is sometimes necessary in traversing a stream in fishing. Accidental releasing of the brake results in the line being wound up under the action of the spring and without control of the fisherman which is likely to result in the braking of some part of the tackle.

Figure 6:
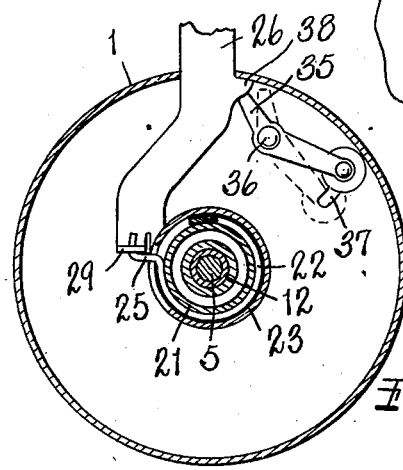
Fig. 6 is a fragmentary section illustrating a modified form or embodiment of the brake release lock-out means.

In the embodiment of our invention shown in Fig. 6, the stop 35 is pivoted at 36 and is provided with a suitable finger piece connected to the stop through the slot 37.

The release member 26 is provided with a laterally projecting stop 38 which, engaging the wall of the casing, limits the outward movement thereof.

The parts of our improved reel are very simple and economical to produce and they are easily assembled.

We have illustrated and described our improvements in embodiments which we have found highly satisfactory. We have not attempted to illustrate or describe certain modifications and adaptations as it is believed that this disclosure will enable those skilled in the art to embody or adapt our improvements as may be desired.

Having thus described our invention, what we claim as new and desire to secure by Letters Patent, is:

1. In a fishing reel, the combination of a housing, a spool, a brake drum mounted in driving relation to said spool, a relatively fixed sleeve disposed concentrically relative to said drum, a coiled spring brake member disposed between said drum and said sleeve and anchored at one end to said sleeve to coact with said drum to prevent rotation of the spool in one direction, means for releasing said brake member to permit rotation of the spool in the other direction comprising a manually operated brake releasing member slidable in said housing and having an offset engaging said spring, and means for rendering said release means inoperative comprising a stop adjustably mounted on said housing to engage said offset to prevent releasing movement of said brake releasing member.

2. In a fishing reel, the combination of a spool, a brake drum mounted in driving relation to said spool, a coiled spring brake member coacting with said drum to prevent rotation of the spool in one direction, means for releasing said brake member to permit rotation of the spool in the other direction comprising a manually operated brake releasing member slidable in said housing, and means for rendering said release means inoperative comprising a manually adjustable stop shiftable to engage said brake releasing member and prevent releasing movement thereof.

3. The combination in a fishing reel, of a spool, a brake drum mounted in driving relation to said spool, a coiled spring brake band coacting with said drum and disposed so that the rotation of the spool in one direction acts to release the brake and rotation thereof in the opposite direction acts to engage the brake, one end of the brake band being anchored, a manually actuated brake releasing member coacting with the free end of said brake band, a spring member acting to retract said manually operated brake release member, and a manually operated member adapted to be adjusted into the path of said manually operated release member for rendering it inoperative.

4. The combination in a fishing reel, of a spool, a brake drum mounted in driving relation to said spool, a coiled spring brake band coacting with said drum and disposed so that the rotation of the spool in one direction acts to release the brake and rotation thereof in the opposite direction acts to engage the brake, one end of the brake band being anchored, a manually actuated brake releasing member coacting with the free end of said brake band, and a manually operated member adapted to be adjusted into the path of said manually operated release member for rendering it inoperative.

5. The combination in a spring wind fishing reel comprising a spool and a driving spring, of a brake means mounted in driving relation to said spool and comprising a drum, a brake band in the form of a coiled spring cooperating with said drum, the coils of the brake band being disposed so that the unwinding rotation of the spool acts to release the brake and the winding rotation thereof acts to engage the brake, a manually operated means for releasing the brake, and adjustable means for preventing the operation of said brake releasing means.

6. In a fishing reel, the combination of a housing, a spool, means for actuating said spool, a brake means for preventing actuation of said spool in one direction by said actuating means, means for releasing said brake means to permit rotation of said spool by said actuating means, and means for rendering said brake releasing means inoperative comprising a stop adjustable manually relative to said brake releasing means and into engagement therewith for preventing brake releasing actuation of said brake releasing means.

7. The combination with a fishing reel comprising a spool and a driving spring, of a brake means operatively associated with the spool comprising a brake drum and a brake band embracing the drum and normally in frictional engagement therewith, said band being anchored at one end and disposed relative to the drum so that the unwinding rotation of the spool acts to disengage the band from the drum and release the brake and so that the winding rotation thereof acts to frictionally and bindingly engage the band with the drum and engage the brake, manually operated means for releasing said brake, and manually adjustable means for engaging said brake releasing means and rendering the same inoperative.

8. The combination in a spring wind fishing reel comprising a spool and a driving spring, of brake means operatively associated with the spool comprising a brake drum in driving relation to said spool, a spring brake band coacting with said drum, said band being anchored at one end, a manually operated slidable release member coacting with the free end of said brake band, a spring member acting to return said brake release member, and a manually operated catch for preventing the actuation of said brake release member.

9. In a reel, the combination of a housing, a spool, a spindle carried by said housing and having lefthand threads at the outer end thereof, an actuating spring for said spool, means for tensioning said spring comprising a rotatable member connected to one end of the spring, a ratchet clutch spring, means connected to said rotatable member and frictionally engaged by said clutch spring to prevent rotation of said rotatable member in one direction, and a relatively fixed member to which one end of said clutch spring is connected, said member being threaded upon said spindle by left-hand threads, the free end of said clutch spring projecting outwardly for manual actuation for releasing the clutch spring.

10. In a reel, the combination of a housing, a spool, a spindle carried by said housing and having left-hand threads at the outer end thereof, an actuating spring for said spool, means for tensioning said spring comprising a rotatable member connected to one end of the spring, a ratchet clutch spring, means connected to said rotatable member and fractionally engaged by said clutch spring to prevent rotation of said rotatable member in one direction, and a relatively fixed member to which one end of said clutch spring is connected, said member being threaded upon said spindle by left-hand threads.

11. The combination in a spring wind reel, of a spool staff, a spool rotatable thereon, a driving spring operatively associated with said spool, a winding member for said spring provided with a clutch drum, a spirally coiled spring friction clutch member coacting with said drum, and a sleeve threaded upon said staff and to which one end of said spring friction member is anchored and so that the spring friction member normally acts to prevent the unscrewing of the sleeve, the free end of said spring friction member projecting outwardly beyond said sleeve for manual manipulation to release the spring friction member.

12. The combination in a spring wind reel, of a spool staff, a spool rotatable thereon, a driving spring operatively associated with said spool, a winding member for said spring provided with a clutch drum, a spirally coiled spring friction member coacting with said drum, and a sleeve threaded upon said staff and to which one end of said spring friction member is anchored and so that the spring friction member normally acts to prevent the unscrewing of the sleeve.

13. The combination in a spring wind reel, of a spool staff, a spool rotatable thereon, a driving spring operatively associated with said spool, winding means for said spring including a ratchet drum, a spring friction ratchet member coacting with said drum, and a member threaded upon said staff and to which said ratchet member is anchored so that it normally acts to prevent the unthreading rotation of the thread member.

14. The combination in a spring winding fishing reel, of a casing comprising a cup-shaped body member, a spool within said casing, a driving spring operatively associated with said spool, a brake drum operatively associated with said spool, a coiled spring brake band coacting with said drum, one end of said brake band being anchored, the brake band being disposed so that the unwinding rotation of the spool acts to release the brake and the winding rotation thereof acts to engage the brake, a brake releasing member of spring material having its inner end slidably arranged within said casing and its outer end projecting therefrom and bowed to provide a spring element, the inner end of said releasing member being operatively associated with the free end of the said brake band, a lever fulcrumed on said casing and connected at its outer end to the spring portion of said releasing member, said releasing member being provided with a laterally projecting stop engageable with the casing to limit the outward movement of the release member, and a pivoted stop coacting with said stop on said release member for locking the release member against inward movement.

15. The combination in a spring winding fishing reel, of a casing comprising a cup-shaped body member, a spool within said casing, a driving spring operatively associated with said spool, a brake drum operatively associated with said spool, a coiled spring brake band coacting with said drum, one end of said brake band being anchored, the brake band being disposed so that the unwinding rotation of the spool acts to release the brake and the winding rotation thereof acts to engage the brake, a brake releasing member of spring material having its inner end slidably arranged within said casing and its outer end projecting therefrom and bowed to provide a spring element, the inner end of said releasing member being operatively associated with the free end of the said brake band, a lever fulcrumed on said casing and connected at its outer end to the spring portion of said releasing member, said releasing member being provided with a laterally projecting stop engageable with the casing to limit the outward movement of the release member, and an adjustable stop for said release member for locking the release member against brake releasing movement.

16. The combination in a spring winding fishing reel, of a casing comprising a cup-shaped body member, a spool within said casing, a driving spring operatively associated with said spool, a brake drum operatively associated with said spool, a coiled spring brake band coacting with said drum, one end of said brake band being anchored, the brake band being disposed so that the unwinding rotation of the spool acts to release the brake and the winding rotation thereof acts to engage the brake, a brake releasing member of spring material having its inner end slidably arranged within said casing and its outer end projecting therefrom and bowed to provide a spring element, the inner end of said releasing member being operatively associated with the free end of the said brake band, and a lever fulcrumed on said casing and connected at its outer end to the spring portion of said releasing member, said releasing member being provided with a laterally projecting stop engageable with the casing to limit the outward movement of the release member.

17. The combination in a spring winding fishing reel, of a support, a spool, a driving spring operatively associated with said spool, a brake operatively associated with said spool, a brake releasing member of spring material having its inner end slidably supported and its outer end bowed to provide a spring element, a lever fulcrumed on said support and fixedly connected at its outer end to the spring portion of said releasing member, and a stop manually adjustable on said support into operative engagement with said release member for locking the release member against brake releasing movement.

SAMUEL G. RUSSELL.
FRANK BURDICK.